May 14, 1957
A. B. SOWTER
2,792,145
CONTAINER OPENING MEANS
Filed April 19, 1954
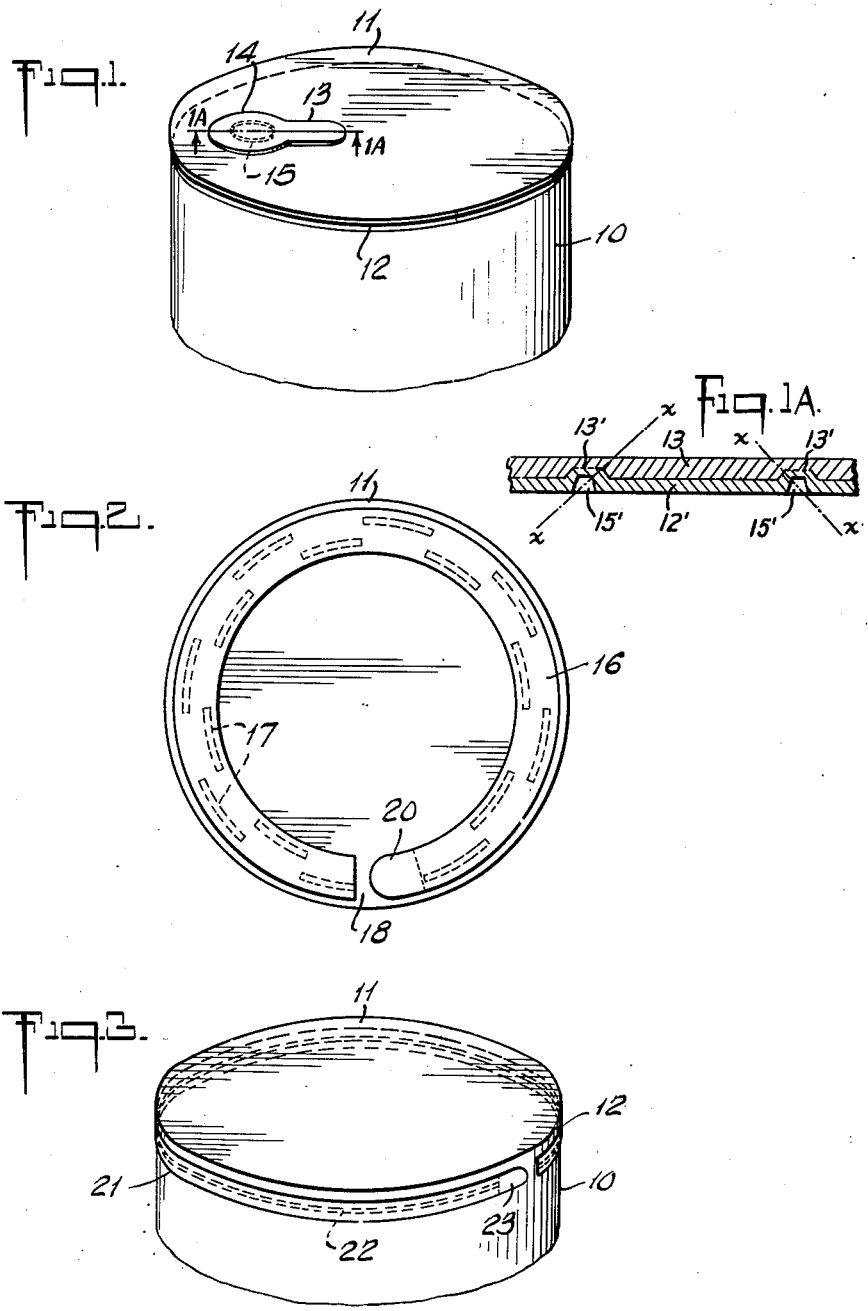
INVENTOR
ANTHONY BAGNOLD SOWTER
BY
ATTORNEY

United States Patent Office 2,792,145
Patented May 14, 1957

2,792,145

CONTAINER OPENING MEANS

Anthony Bagnold Sowter, Ickenham, England, assignor to The General Electric Company Limited, London, England Application April 19, 1954, Serial No. 424,204

4 Claims. (Cl. 220—54)

This application is a continuation-in-part of my application Serial No. 185,811, filed September 20, 1950, now abandoned, entitled Means for and Method of Pressure Welding.

The present invention relates to improvements in sealed metal containers, more particularly to a simple and reliable means for and method of opening a container for removing the contents thereof, substantially without requiring the use of any special implement, such as a can opener, opening key, or the like.

An important object of the invention is the adaptation of cold pressure welding to a means for providing an opening in a sealed container formed at least in part of cold pressure weldable material.

A more specific object of the invention is the provision of a tearing or opening tag being cold pressure welded to the outside of a sealed receptacle or container of ductile and cold pressure weldable metal, such as alumimum, copper, etc. or to a portion of the receptacle consisting of cold pressure weldable material, said tag having a thickness in relation to the container wall and/or a hardness or degree of ductility relative to the container material so as to allow of a simple tearing away of the container wall around the edges of the cold weld joint, to result in an opening in the container wall sufficient for emptying the contents thereof.

According to one aspect of the invention, a container formed at least in part of cold pressure weldable material has attached thereto by cold pressure welding an opening tag or strip or the like detachable member, the said tag, strip or like member being so welded to said part that, once torn off or detached from the part, it leaves an opening in the container. The shape and size of the opening can be determined or controlled either by the shape of the tag and/or the configuration of the cold weld joint. According to a simple embodiment, if the joint is of an annular or ring shape, the metal will tear around the outer periphery of the ring, in such a manner as to remove a disc-shaped slug and to leave a circular opening or pouring hole in the container wall, such as in the top of a metal can, as described in further detail hereafter.

Thus, there is normally no opening or weakened part in the container wall, as in the case of previous opening tags or similar devices known in the art. The mechanism by which the opening is produced in the part will be obvious, the opening tag or strip serving to pull a slug from the part or container wall. This preferential "holing" or tearing may be obtained by any suitable method of cold pressure welding two metal parts known to those skilled in the art, such as described in my U. S. Patent No. 2,522,408.

The invention will be better understood from the following detailed description taken in reference to the accompanying drawing forming part of this specification and wherein:

Fig. 1 is a perspective view of a metal can top provided with a simple opening or tearing tag according to the invention;

Fig. 1A is a cross-section, on an enlarged scale, taken on line 1A of Fig. 1.

Fig. 2 is a top view of a can showing a modification in the form of an annular opening or tearing tag concentric to the can; and Fig. 3 is a further perspective view of a can top provided with a cylindrical tearing tag or strip below the edge of the can.

Like reference numerals identify like parts in the different views of the drawing.

One method which may be used for carrying out the invention is that described in the above-mentioned parent application, according to which members of different thickness are welded together by making a strip-like weld indentation so that metal is caused to flow at the interface to effect welding from one side only, the side being that of the thinner member and the welding surface dimensions of the welding tool making the indentation being chosen to suit the thickness of the thinner member. If a closed such as an annular or ring-shaped weld of this type is torn apart, a hole will be torn preferentially in the thinner member, the latter being the container wall in the case of the present invention. Accordingly the tag or the like is made of the thicker member and the container or part of the container consisting of pressure weldable metal constitutes the thinner member.

A similar effect can be obtained by a tag of substantially the same thickness as the container wall but consisting of a harder or less ductile metal than the container. Finally the parts may consist of the same metal of like thickness, a relatively thicker or harder tag being however preferable in the interest of enabling an easy tearing without requiring excessive force or the use of a special opening tool or implement.

One useful application of the method according to the invention is the case where it is required to provide an opening in the top of a sealed metal can made wholly from pressure weldable material, such as commercially pure aluminum. Thus, it may be necessary with a sealed can containing a liquid to provide a ready means of opening and pouring the liquid from the can. This may be done by cold pressure welding to the top of the can a suitable tearing or rip tag in the manner described, and pulling the tag away from the container top to cause the welded metal of the can to come away with the thicker and/or harder material of the tag and to leave a pouring hole in the container. If the weld is of annular or other closed form, a disc or slug of material from the top of the can will be torn away by the tag, to thereby leave a suitable pouring hole or opening.

A rip or tearing tag of this type is shown in Fig. 1 of the drawing, wherein numeral 10 indicates the can of say .009" commercially pure aluminum, 11 is the can top secured thereto in any suitable manner, such as by first cold pressure welding the top to a radial outward flange of the can by an annular indentation weld 12 and then dressing down the welded flange against the outside of the can as shown. The tag 13 of say .018" commercially pure aluminum terminates in an enlarged circular end portion 14 which is welded by an annular indentation pressure weld 15 to the outside of the top, in such a manner that when the tag 13 is pulled off, the metal of the can is torn around the outer edge of the weld 15, thus removing a circular slug and leaving an opening or pouring hole in the top 11.

An advantage of using cold pressure welding for making a rip tag of the type according to the invention is the fact that the shape or configuration of the weld area or joint can be closely determined or controlled by the shape of the welding or pressure tools, to produce a tearing hole or opening of any desired size or shape consistently and in a most simple manner.

The making of the cold weld joint per se, in particular a ring shaped or strip-like weld by means of suitable pressure or indenting tools, is described in my above-mentioned U. S. Patent 2,522,408 to which reference is made for further details. More particularly, in joining a thinner member to a thicker member, such as in welding the container wall to an opening tag of greater thickness according to the invention, the width of the weld line or strip and the tool penetration made through the thinner member and into the thicker member are governed by the thickness of the thinner member or container wall, the width of the weld strip being about 1.5 times the thickness of the thinner member and the tool penetration being at least 1.2 times said thickness, as described in the above-mentioned parent application.

The invention will be further understood by reference to Fig. 1A showing a cross-section through the tag 13 and weld joint 15. According to the example illustrated, the tag 13 has a thickness about twice the thickness of the adjacent container wall portion 12', welding in this case being advantageously made from the thinner into the thicker material, to result in a closed such as a circular indentation 15' having a width about 1.5 times the thickness of the container wall and a depth of about 1.2 times said thickness for aluminum, as described hereinabove. Welding may be effected by means of a pair of pressure tool members or dies forming part of a hand press or the like, the upper tool member, in the example shown, having a flat surface to act as an anvil and lower tool member having a flat surface and projecting therefrom a circular welding rib of a width and height corresponding to the width and depth of the indentation 15'. As a result of the pressure applied to the members 12' and 13, metal is caused to flow laterally of the strip-like circular area, whereby to result in a merging and welding at the interface in the form of a solid phase welded bond or joint, as indicated by the dotted lines at 13' in the drawing. At the same time, the metal at the weld is work hardened by the effect of the applied pressure, resulting in a strengthened texture or grain structure of the metal. As a result, if the tag 13 is pulled away from the container, the container metal will tear along the weld line and across the section of the container wall at X—X, thus leaving a free circular slug and providing a pouring opening, in the manner described and understood from the foregoing. The work hardening of the metal at the joint greatly assists in the tearing or ripping off of the container metal. For this reason, a tag having an equal thickness to the thickness of the container wall may be used in many cases. Alternatively or additionally, the tag may be of relatively harder material to assist in the tearing of the pouring opening, in the manner as described and pointed out hereinabove.

Fig. 2 shows a modification of a rip tag for removing substantially the entire top of a container. For this purpose there is provided a ring-shaped tearing tag or strip 16 being interrupted by a narrow radial slit 18 and cold welded to the top 11 of the can through a series of staggered overlapping arcuate spot indentation welds 17. The latter may be produced by a welding or pressure tool having a flat surface and projecting therefrom a plurality of suitable projections or welding tongues conforming to the welds 17, in a manner readily understood. The member 16 preferably has a greater thickness than the container wall and is provided with a free or unwelded end portion 20 which upon being bent up serves as a means for tearing a disc or slug out of the container along the outer periphery of the welds 17.

Referring to Fig. 3 there is shown another modification of the invention in the form of a cylindrical tearing strip 21 pressure welded to the outside of the cylindrical container portion adjacent to its upper edge by means of a linear or strip-like indentation weld 22. Again, this tag is provided with a free or unwelded end which upon bending serves as a means for completely severing the top 11 by tearing along the weld 22, in a manner readily understood.

There is thus provided by the invention a simple and efficient tearing or rip tag or the like detachable member and a method of attaching the same to a container by a solid phase pressure welding joint and tearing or severing the container metal to produce a hole or opening in the container wall, substantially without the use of a special implement and without requiring scoring, weakening or any other changes of the container material. The shape and size of the hole left is determined or controlled by the shape or configuration of the welded joint which, in turn, can be simply varied by the shape of the indenting or pressure welding tools to suit any requirements, the tearing of the container metal or severing of the slug producing the hole or opening being along the outer edge of the weld area, as understood and described with reference to the drawing.

In the foregoing the invention has been described with reference to a specific illustrative device and method. It will be evident, however, that modifications and variations, as well as the substitution of equivalent elements and steps for those described for illustration, may be made without departing from the broader scope and spirit of the invention as defined by the appended claims. The specification and drawing are accordingly to be regarded in an illustrative rather than in a restrictive sense.

I claim:

1. In combination with a sealed container having at least a wall portion consisting of cold pressure weldable metal, a tearing tag or the like detachable member also of cold pressure weldable material, for producing a pouring opening or the like, said tag overlying said wall portion and having a portion secured to said container by a closed linear indentation pressure welded joint, said wall portion of the container being otherwise unweakened, to define and enclose a tearing area, whereby to cause a severing of the container metal and to leave an opening at said area by tearing said tag off the container wall.

2. In combination with a sealed container having at least a wall portion consisting of cold pressure weldable metal, a tearing tag or the like detachable member also of cold pressure weldable material and of relatively greater thickness than the container metal, for producing a pouring opening or the like, said tag overlying said wall portion and having a portion secured to the container by a closed linear indentation pressure welded joint, said wall portion of the container being otherwise unweakened, to define a tearing area enclosed by said joint, whereby to cause a severing of the container metal and to leave an opening at said area by tearing said tag off the container wall.

3. In combination with a sealed container of cold pressure weldable metal, a tearing tag or the like detachable member also of cold pressure weldable material, for producing a pouring opening or the like, said tag overlying a wall portion of the container and having a portion secured thereto by a linear ring-shaped indentation pressure welded joint, said wall portion of the container being otherwise unweakened to define a tearing area enclosed by said joint, whereby to cause a severing of the container metal and to leave a circular opening at said area by tearing said tag off the container wall.

4. In combination with a sealed container of cold pressure weldable metal, a tearing tag or the like detachable member also of cold pressure weldable material and having a thickness greater than the thickness of the container metal, for producing a pouring opening or the like, said tag overlying a wall portion of the container and having a portion secured thereto by a linear ring-shaped indentation pressure welded joint, said wall portion of the container being otherwise unweakened to define a tearing area enclosed by said joint, whereby to cause severing of the container metal and to leave a circular opening in the container wall at said area by tearing said tag off the container.

References Cited in the file of this patent
UNITED STATES PATENTS

| | | |
|---|---|---|
| 1,605,685 | Mock | Nov. 2, 1926 |
| 1,690,800 | Stewart | Nov. 6, 1928 |
| 2,105,445 | Sebell | Jan. 11, 1938 |